United States Patent
Mochizuki et al.

(10) Patent No.: US 12,483,773 B2
(45) Date of Patent: Nov. 25, 2025

(54) IMAGE CAPTURE APPARATUS, WEARABLE DEVICE AND A CONTROL METHOD THAT CONTROL FRAMING BASED ON ACQUIRED POSITION INFORMATION AND A DETECTION RESULT

(71) Applicant: CANON KABUSHIKI KAISHA, Tokyo (JP)

(72) Inventors: Toshihiro Mochizuki, Kanagawa (JP); Tsuyoshi Mima, Kanagawa (JP); Takumi Tsuchiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 112 days.

(21) Appl. No.: 18/344,989

(22) Filed: Jun. 30, 2023

(65) Prior Publication Data
US 2024/0040227 A1    Feb. 1, 2024

(30) Foreign Application Priority Data

Jul. 27, 2022    (JP) ................................. 2022-119837

(51) Int. Cl.
| | |
|---|---|
| *H04N 23/57* | (2023.01) |
| *G02B 27/01* | (2006.01) |
| *G06V 10/24* | (2022.01) |
| *G06V 10/25* | (2022.01) |

(Continued)

(52) U.S. Cl.
CPC ............. *H04N 23/57* (2023.01); *G02B 27/01* (2013.01); *G06V 10/24* (2022.01); *G06V 10/25* (2022.01); *H04N 23/58* (2023.01); *H04N 23/64* (2023.01); *G02B 2027/0138* (2013.01); *G02B 2027/014* (2013.01); *G02B 2027/0178* (2013.01); *G06V 2201/07* (2022.01)

(58) Field of Classification Search
CPC ........ H04N 23/57; H04N 23/58; H04N 23/64; H04N 23/50; H04N 23/695; G02B 27/01; G02B 2027/0138; G02B 2027/014; G02B 2027/0178; G06V 10/24; G06V 10/25; G06V 2201/07; G06V 40/193
See application file for complete search history.

(56) References Cited

U.S. PATENT DOCUMENTS

| | | | |
|---|---|---|---|
| 10,546,193 B2 * | 1/2020 | Schmidt | ......... G06Q 10/063114 |
| 10,567,641 B1 * | 2/2020 | Rueckner | ............... H04N 23/62 |
| 11,184,550 B2 | 11/2021 | Ogawa | |

(Continued)

FOREIGN PATENT DOCUMENTS

| | | |
|---|---|---|
| JP | 2016-201686 A | 12/2016 |
| JP | 2020-092354 A | 6/2020 |

*Primary Examiner* — Yogesh K Aggarwal
(74) *Attorney, Agent, or Firm* — Venable LLP

(57) ABSTRACT

An image capture apparatus that includes a communication unit configured to communicate with a plurality of wearable devices, an image capturing unit configured to capture an image, an acquisition unit configured to acquire, from the wearable devices via the communication unit, position information of an object at which users wearing the wearable devices are gazing, and a control unit configured to control framing based on the position information of the object acquired by the acquisition unit in response to transmission of position information of the image capture apparatus to the wearable devices via the communication unit.

13 Claims, 8 Drawing Sheets

(51) Int. Cl.
 *H04N 23/58* (2023.01)
 *H04N 23/60* (2023.01)

(56) References Cited

U.S. PATENT DOCUMENTS

| | | |
|---|---|---|
| 2020/0186721 A1 | 6/2020 | Ogawa |
| 2022/0201194 A1 | 6/2022 | Akisada et al. |

\* cited by examiner

FIG. 2
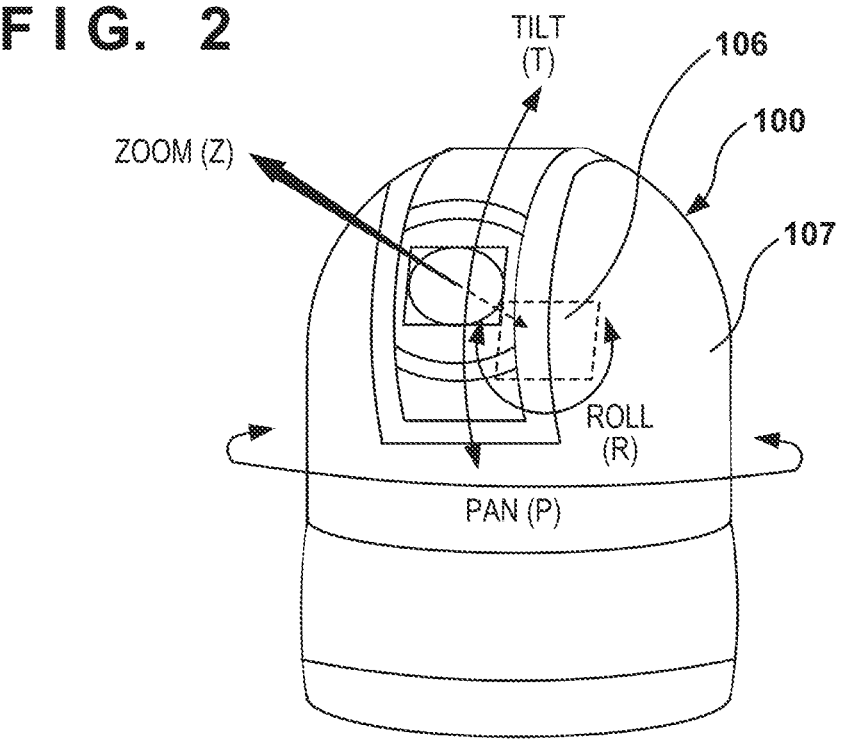
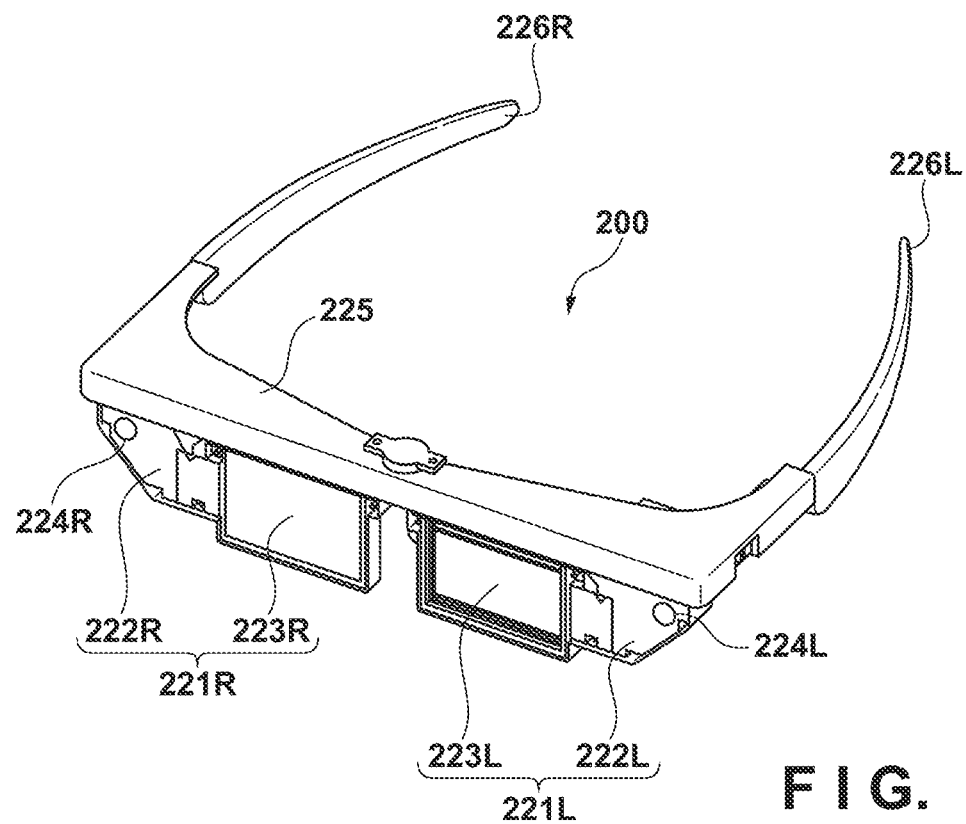
FIG. 3

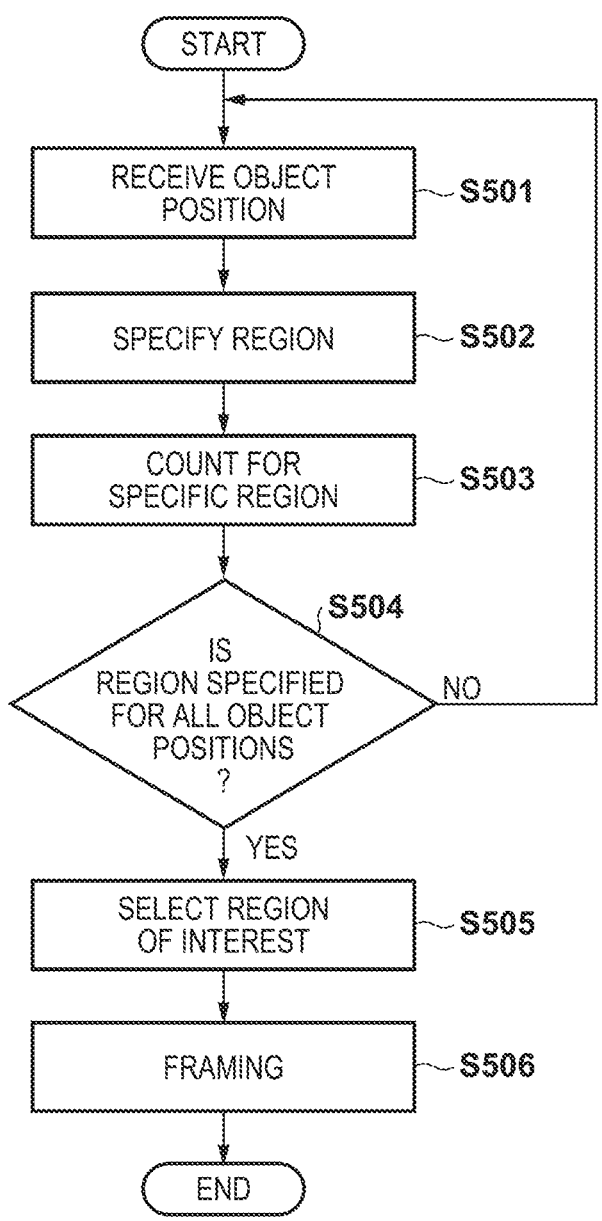

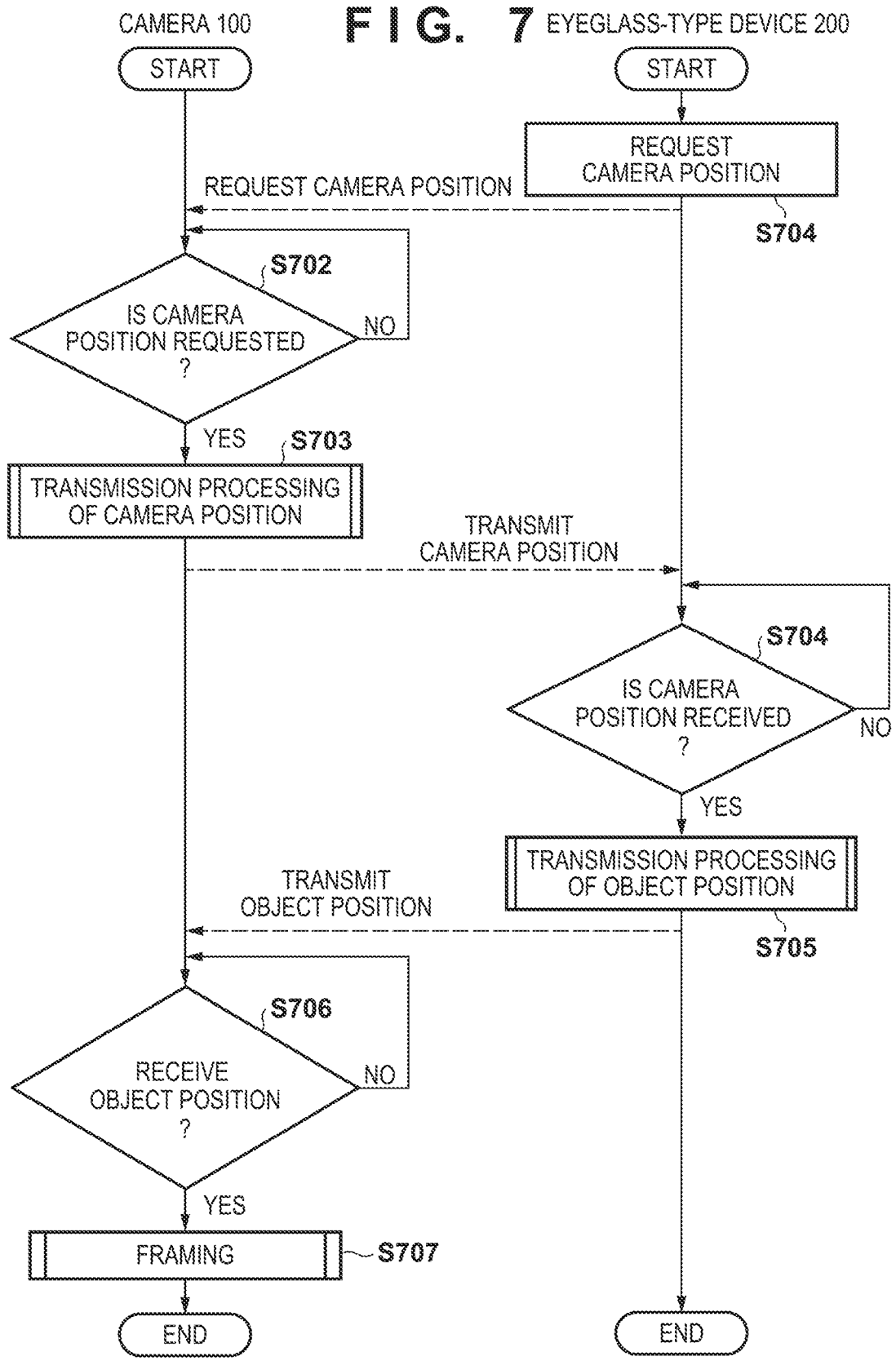

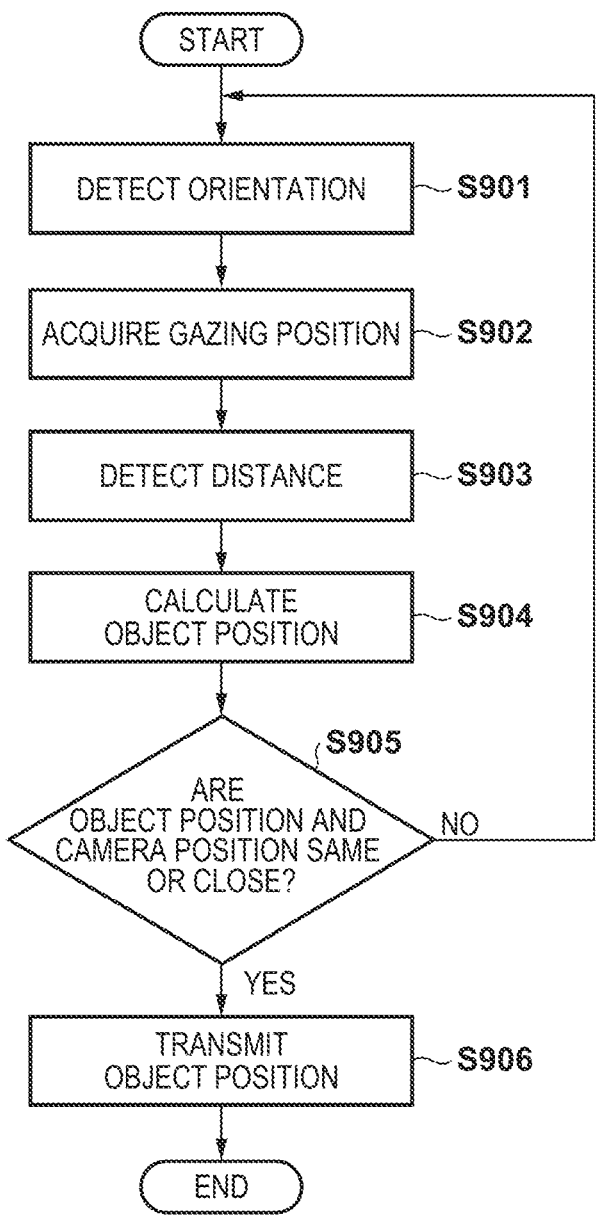

IMAGE CAPTURE APPARATUS, WEARABLE DEVICE AND A CONTROL METHOD THAT CONTROL FRAMING BASED ON ACQUIRED POSITION INFORMATION AND A DETECTION RESULT

CROSS-REFERENCE TO PRIORITY APPLICATION

This application claims the benefit of Japanese Patent Application No. 2022-119837, filed Jul. 27, 2022, which is hereby incorporated by reference herein in its entirety.

BACKGROUND OF THE INVENTION

Field of the Invention

The present invention relates to a system for automatically performing framing based on positional information of an object acquired from a wearable device.

Description of the Related Art

Japanese Patent Laid-Open No. 2020-92354 discloses an image capture apparatus for automatically performing framing and image capturing without depending on a user operation. Meanwhile, eyeglass-type devices are known as a type of wearable device, and it is envisioned that, in the future, the image capture apparatuses will automatically perform image capturing in cooperation with user worn eyeglass-type devices.

Incidentally, in Japanese Patent Laid-Open No. 2020-92354, information outside an image capturing range is not obtained, and thus there are cases when it is difficult to automatically perform framing. For example, when multiple users are watching multiple competitive items that are being held at a single site at the same time, conventionally, it has not been possible to know on which item each of the users is focused, and, thus, it is difficult to perform framing so as to include a region outside the image capturing range.

SUMMARY OF THE INVENTION

The present invention has been made in consideration of the aforementioned problems, and realized techniques that enable automatic framing in accordance with an object on which a plurality of users are focused.

In order to solve the aforementioned problems, the present invention provides an image capture apparatus comprising a communication unit configured to communicate with a plurality of wearable devices, an image capturing unit configured to capture an image, an acquisition unit configured to acquire position information of an object at which users wearing the wearable devices are gazing, and a control unit configured to control framing based on the position information of the object.

In order to solve the aforementioned problems, the present invention provides a wearable device comprising a communication unit configured to communicate with an image capture apparatus, a display unit configured to display an image, an acquisition unit configured to acquire position information of an object at which a user wearing the wearable device is gazing, and a control unit configured to transmit the position information of the object to the image capture apparatus.

In order to solve the aforementioned problems, the present invention provides a method of controlling an image capture apparatus, wherein the image capture apparatus includes: a communication unit configured to communicate with a plurality of wearable devices, and an image capturing unit configured to capture an image, and the control method includes acquiring position information of an object at which users wearing the wearable devices are gazing, and controlling framing based on the position information of the object.

In order to solve the aforementioned problems, the present invention provides a non-transitory computer-readable storage medium storing a program for causing a computer to function as an image capture apparatus comprising a communication unit configured to communicate with a plurality of wearable devices, an image capturing unit configured to capture an image, an acquisition unit configured to acquire position information of an object at which users wearing the wearable devices are gazing, and a control unit configured to control framing based on the position information of the object.

According to the present invention, it is possible to automatically perform framing in accordance with an object on which a plurality of users are focused.

Further features of the present invention will become apparent from the following description of exemplary embodiments (with reference to the attached drawings).

BRIEF DESCRIPTION OF THE DRAWINGS

FIG. 2 is an external view of the image capture apparatus according to the first embodiment.

FIG. 3 is an external view of the wearable device according to the first embodiment.

FIG. 5 is a flowchart illustrating control processing of the image capture apparatus according to the first embodiment.

FIG. 7 is a flowchart illustrating control processing of an image capture apparatus and a wearable device according to a second embodiment.

FIG. 9 is a flowchart illustrating transmission processing that is performed by the wearable device according to the second embodiment.

DESCRIPTION OF THE EMBODIMENTS

Figure 1:
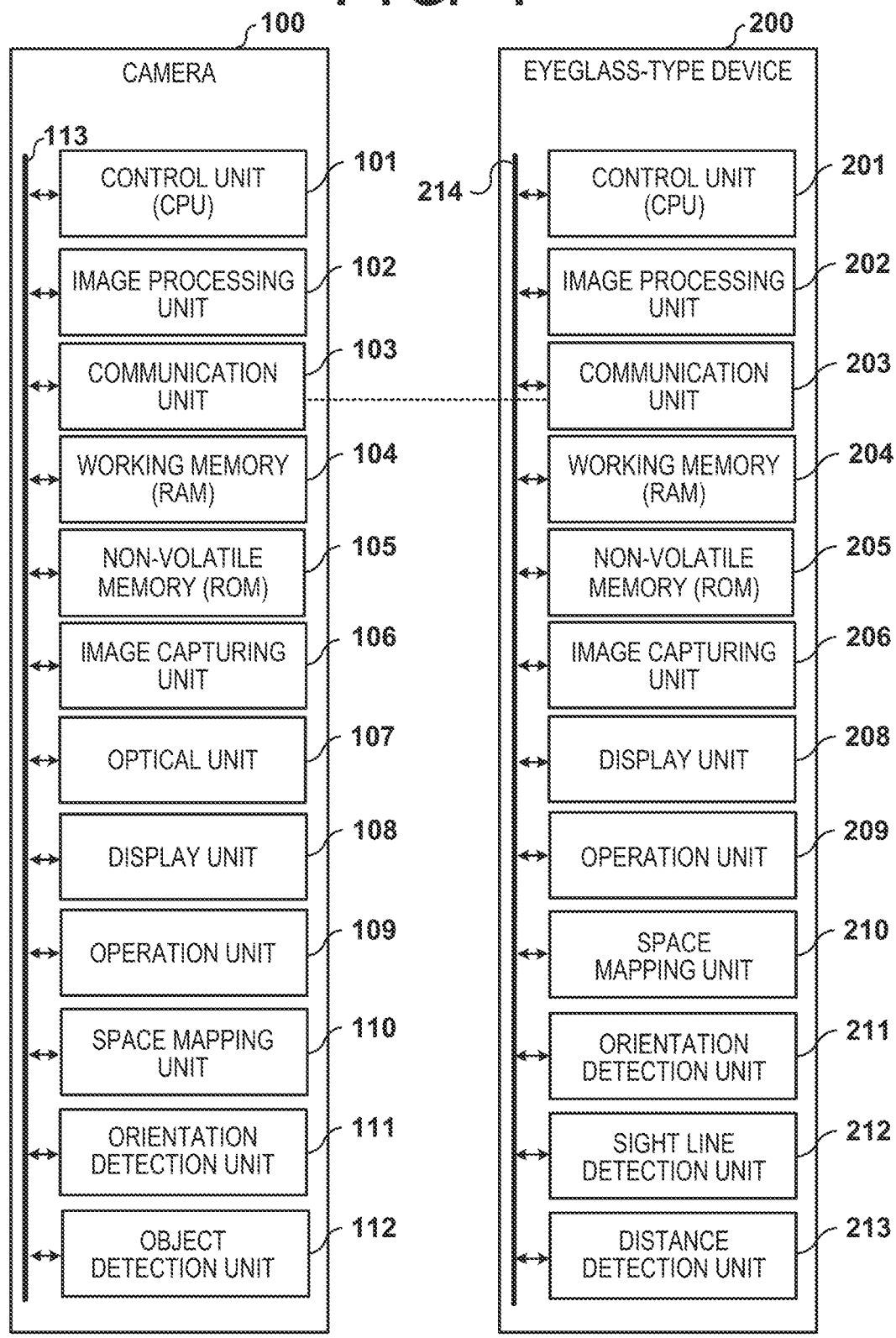
FIG. 1 is a block diagram illustrating an image capture apparatus and a wearable device according to a first embodiment.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

First Embodiment

An embodiment in which an image capture apparatus according to the present invention is applied to a digital camera (hereafter, a camera) that can automatically perform framing and capture a still image and a moving image, or the like, and a wearable device according to the present invention is applied to an eyeglass-type device (smart glasses) that is able to communicate with the image capture apparatus will be described below in detail with reference to the drawings. Note that the wearable device is not limited to an eyeglass-type device, and may be a smart device, a tablet device, a watch-type device, or the like, as long as it is possible to acquire position information about an object on which the user is focused.

System Configuration

First, a system configuration according to the first embodiment will be described.

As shown in FIG. 1, a system according to the first embodiment includes a camera 100 and an eyeglass-type device 200. The camera 100 communicates with the eyeglass-type device 200, and acquires, from the eyeglass-type device 200, position information of an object at which the user is gazing. The camera 100 then automatically performs framing based on the position information of the object at which the user is gazing, the position information having been acquired from the eyeglass-type device 200, and captures a still image or a moving image.

The camera 100 transmits a captured image to the eyeglass-type device 200. The user wearing the eyeglass-type device 200 can remotely monitor the image captured by the camera 100, in real time. In addition, the camera 100 has an object detection function and a tracking function, and can also automatically track a predetermined object.

The camera 100 is installed at a location where an image of an object can be captured. Each user wears and uses the eyeglass-type device 200. The camera 100 and the eyeglass-type device 200 are connected to each other using a wireless communication method, for example, and can transmit/receive images and other information to/from each other.

Apparatus Configurations

Next, configurations and functions of the camera 100 and the eyeglass-type device 200 according to the first embodiment will be described with reference to FIGS. 1 to 3.

FIG. 1 is a block diagram illustrating configurations of the camera 100 and the eyeglass-type device 200 according to the first embodiment. FIG. 2 is an external view of the camera 100 according to the first embodiment. FIG. 3 is an external view of the eyeglass-type device 200 according to the first embodiment.

First, the configuration of the camera 100 will be described with reference to FIGS. 1 and 2.

The camera 100 includes a control unit 101, an image processing unit 102, a communication unit 103, a working memory 104, a non-volatile memory 105, an image capturing unit 106, an optical unit 107, a display unit 108, an operation unit 109, a space mapping unit 110, an orientation detection unit 111, and an object detection unit 112. The components of the camera 100 are connected such that information can be transmitted/received to each other using an internal bus 113.

The control unit 101 performs computation processing for controlling the camera 100. The control unit 101 includes a processor such as a CPU for controlling the components of the camera 100.

The image processing unit 102 performs computation processing of image data acquired by the image capturing unit 106, computation processing of data for evaluative exposure metering acquired by the image capturing unit 106, and computation processing of control data for controlling the optical unit 107.

The communication unit 103 includes an interface for a connection that enables communication with the eyeglass-type device 200. The interface is a wireless communication interface conforming to a wireless communication system such as Wi-Fi®, Bluetooth®, infrared ray communication, or a wireless USB, or a public wireless communication system, such as 4G or 5G, for example. The communication unit 103 can transmit/receive image data, object position information, camera position information, and the like, to/from the eyeglass-type device 200.

The working memory 104 is a RAM, for example. The working memory 104 is used as a working area for loading constants and variables for operations of the control unit 101, a program read out from the non-volatile memory 105, and the like. In addition, the working memory 104 is used as a buffer memory that temporarily holds image data of an image captured by the image capturing unit 106.

The non-volatile memory 105 is a ROM, for example. The non-volatile memory 105 stores constants for operations of the control unit 101, a program, and the like. Here, the program is a program for executing control processing to be described later.

The image capturing unit 106 includes an image sensor constituted by photoelectric conversion elements, such as a CCD image sensor or a CMOS image sensor for converting object image light into electrical signals, an A/D converter for converting analog signals output from the image sensor into digital signals. The image capturing unit 106 converts object image light formed by a lens included in the optical unit 107 into electrical signals, using the image sensor, through control that is performed by the control unit 101, performs noise reducing processing, and the like, and outputs image data constituted by digital signals.

The optical unit 107 includes a lens group that includes a zoom lens and a focus lens, a shutter that has a diaphragm function, and a mechanism for driving these optical members. The optical unit 107 performs at least one of rotating the image capturing range (field of view) of the camera 100 about the pan (P) axis (horizontal direction) or the tilt (T) axis (perpendicular direction), moving the image capturing range along the zoom (Z) axis (enlarge/shrink direction), and rotating the image capturing unit 106 about the roll (R) axis, by driving the optical members.

Note that the camera 100 according to the first embodiment will be described as an example of a camera that performs framing by controlling the optical unit 107 in the pan (P), tilt (T), zoom (Z), and roll (R) directions, but there is no limitation thereto. The camera 100 may be able to perform framing by moving or rotating the camera itself as with a drone, or may be able to perform framing by being moved or rotated by an external member as with a movable camera platform such as a gimbal.

Note that panning (Panoramic) refers to swiveling in the horizontal direction. Tilting refers to swiveling in the perpendicular direction. Zooming refers to zooming up (telephoto) and zooming out (wide field of view). In addition, rolling refers to an angle of rotation about the optical axis of the image sensor. Furthermore, the camera 100 may be movable in at least one of the up-down direction, the right-left direction, and the front-rear direction.

The display unit 108 is a display device such as a liquid crystal display or an organic EL display. The display unit 108 displays an image received from the camera 100, a GUI (Graphical User Interface), and the like.

The operation unit 109 includes an operation member that accepts a user operation, and outputs, to the control unit 101, an operation signal that is based on a user operation.

The space mapping unit 110 generates a three-dimensional distance map of a physical space in which the camera 100 is present, by detecting distance information including a distance to a physical object in the surroundings of the camera 100, using a distance sensor, or the like. In the three-dimensional distance map, position information of the camera 100 and position information of the eyeglass-type device 200 are associated with each other, and thus the camera 100 can convert position information of an object acquired from the eyeglass-type device 200, into the coordinate system of the camera 100.

The orientation detection unit 111 includes an acceleration sensor, a gyro sensor, or a GPS sensor, for example, and detects orientation information of the camera 100, and outputs the orientation information to the control unit 101. The orientation information includes position information (image capturing position) of the camera 100, and inclination information (image capturing direction) of the camera 100 in the horizontal direction or the perpendicular direction. Note that the orientation detection unit 111 is not limited to an acceleration sensor, a gyro sensor, or a GPS, and it suffices for the orientation detection unit 111 to be able to detect orientation information of the camera 100.

The object detection unit 112 detects an object in image data acquired by the image capturing unit 106, and acquires type information (for example, the face of a person) and position information of the detected object. In addition, the object detection unit 112 has a tracking function for automatically tracking a predetermined object.

Configuration of Eyeglass-type Device 200

Next, the configuration of the eyeglass-type device 200 will be described with reference to FIGS. 1 and 3.

Note that the configurations of a control unit 201, an image processing unit 202, a communication unit 203, a working memory 204, a non-volatile memory 205, an image capturing unit 206, an operation unit 209, a space mapping unit 210, and an orientation detection unit 211 are similar to those of the camera 100, and thus a detailed description thereof is omitted, and a description will be given below with a focus on different configurations. The components of the eyeglass-type device 200 are connected such that information can be transmitted/received to/from each other using an internal bus 214.

A display unit 208 is an optical see-through display. The eyeglass-type device 200 includes a right-eye display unit 221R and a left-eye display unit 221L that are supported by a frame. The frame includes a rim 225 that supports the right-eye display unit 221R and the left-eye display unit 221L, a right temple 226R and a left temple 226L that are joined at right and left end portions of the rim 225. Light from a display element (not illustrated) of the right-eye display unit 221R is guided to the right eye of the user wearing the eyeglass-type device 200 by an image projection unit 222R and a light guiding unit 223R. Similarly, light from a display element (not illustrated) of the left-eye display unit 221L is guided to the left eye of the user wearing the eyeglass-type device 200 by an image projection unit 222L and a light guiding unit 223L. The user wearing the eyeglass-type device 200 can visually recognize images displayed on the right-eye display unit 221R and the left-eye display unit 221L and light entering from the front side of the eyeglass-type device 200, at the same time.

The image capturing unit 206 includes a right image capturing unit 224R provided on the right side of the right-eye display unit 221R and a left image capturing unit 224L provided on the left side of the left-eye display unit 221L. The right image capturing unit 224R and the left image capturing unit 224L include an optical system such as a lens, and can capture an image of a surrounding region of the eyeglass-type device 200 that includes a region in front thereof.

A sight line detection unit 212 includes a dichroic mirror, an image forming lens, a sight line detection sensor, an infrared light emitting diode, or the like, and detects the direction and the position of the sight line of the user wearing the eyeglass-type device 200. The sight line detection unit 212 detects a sight line using a method called "corneal light reflex", for example. Corneal light reflex is a method for detecting the direction of a sight line based on the positional relation between the pupil of the eyeball and infrared light emitted from the infrared light emitting diode and reflected by the eyeball, specifically the cornea. Besides, there are various methods such as scleral light reflex that uses a difference in light reflectance between a black part and a white part of an eye, and any method that can detect the orientation and the position of a sight line may be used. In addition, the sight line detection unit 212 detects the intersection between the sight line direction of the right eye and the sight line direction of the left eye, as a position that the user is gazing at (gazing position).

The distance detection unit 213 detects distance information including the distance between the eyeglass-type device 200 and an object. The distance detection unit 213 calculates distance information including the distance between the eyeglass-type device 200 and the object for each of the right-eye display unit 221R and the left-eye display unit 221L of the display unit 208, based on lens position information and phase difference information (defocus amount) detected using a phase difference detection method that is used for focus detection (autofocus), for example. Note that a distance detection method that is performed by a distance detection unit 213 is not limited to the phase difference detection method, and any method that can detect distance information including a distance to an object may be adopted.

Control Processing of Eyeglass-Type Device 200

Next, control processing of the eyeglass-type device 200 according to the first embodiment will be described with reference to FIG. 4.

Figure 4:
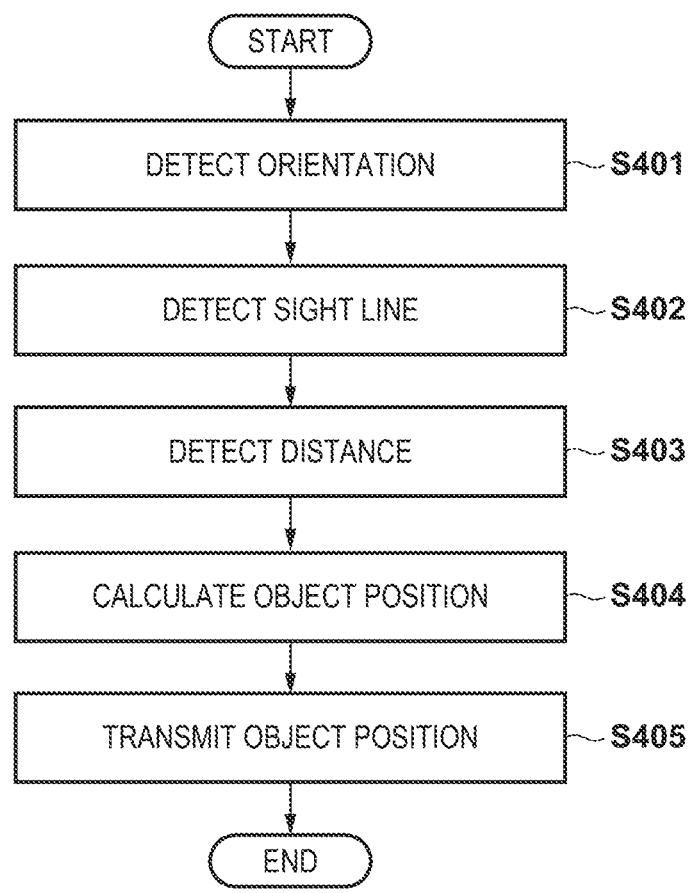
FIG. 4 is a flowchart illustrating control processing of the wearable device according to the first embodiment.

FIG. 4 is a flowchart illustrating control processing of the eyeglass-type device 200 according to the first embodiment.

The processing in FIG. 4 is realized by the control unit 201 of the eyeglass-type device 200 executing a program stored in the non-volatile memory 205, and controlling components of the eyeglass-type device 200. In addition, the processing in FIG. 4 is started in a state where initialization processing of the eyeglass-type device 200 (initial settings of the components after the power supply is turned on, and pairing with the camera 100) is complete. The same applies to FIGS. 7 to 9, which will be described later.

In step S401, the control unit 201 acquires orientation information of the eyeglass-type device 200 detected by the orientation detection unit 211, and advances the procedure to step S402.

In step S402, the control unit 201 acquires information regarding the sight line position of the user relative to the display unit 208, the information having been detected by the sight line detection unit 212, and the procedure advances to step S403.

In step S403, the control unit 201 acquires distance information including the distance between the display unit 208 and an object at the sight line position of the user acquired in step S402, the information having been detected by the distance detection unit 213, and the procedure advances to step S404.

In step S404, the control unit 201 calculates position information of the object to which the user is gazing, by adding the distance information acquired in step S403 to the orientation information of the eyeglass-type device 200 acquired in step S401, and the procedure advances to step S405.

In step S405, the control unit 201 transmits the position information of the object calculated in step S404, to the camera 100 using the communication unit 203, and ends the processing.

Note that a method for calculating an object position in step S404 is not limited to the above method, and, for example, the processing in step S402 can be omitted by using distance information, including the distance to the object detected, while the position of the display unit 208 is fixed at the center between the right-eye display unit 221R and the left-eye display unit 221L or the like. In addition, when the distance detection unit 213 does not detect distance information (resolution) for each of the right-eye display unit 221R and the left-eye display unit 221L of the display unit 208, the processing in step S402 can be omitted by using distance information including the distance to the object detected in a similar manner.

Control Processing of Camera 100

Next, control processing of the camera 100 according to the first embodiment will be described with reference to FIG. 5.

FIG. 5 is a flowchart illustrating control processing of the camera 100 according to the first embodiment.

The processing in FIG. 5 is realized by the control unit 101 of the camera 100 executing a program stored in the non-volatile memory 105, and controlling the components of the camera 100. The same applies to FIGS. 7 to 9, which will be described later. The processing in FIG. 5 is started in a state when initialization processing of the camera 100 (initial settings of the components after the power supply is turned on, and pairing with the eyeglass-type device 200) is complete, and the camera 100 is ready to control framing.

In step S501, the control unit 101 receives position information of an object from the eyeglass-type device 200 using the communication unit 103, and advances the procedure to step S502.

In step S502, the control unit 101 specifies a region in the coordinate system of the camera 100, for the position information of the object received in step S501, and advances the procedure to step S503.

Here, a method for specifying a region in the coordinate system of the camera 100, for position information of an object, will be described with reference to FIGS. 6A to 6C.

Figures 6A, 6B, 6C:
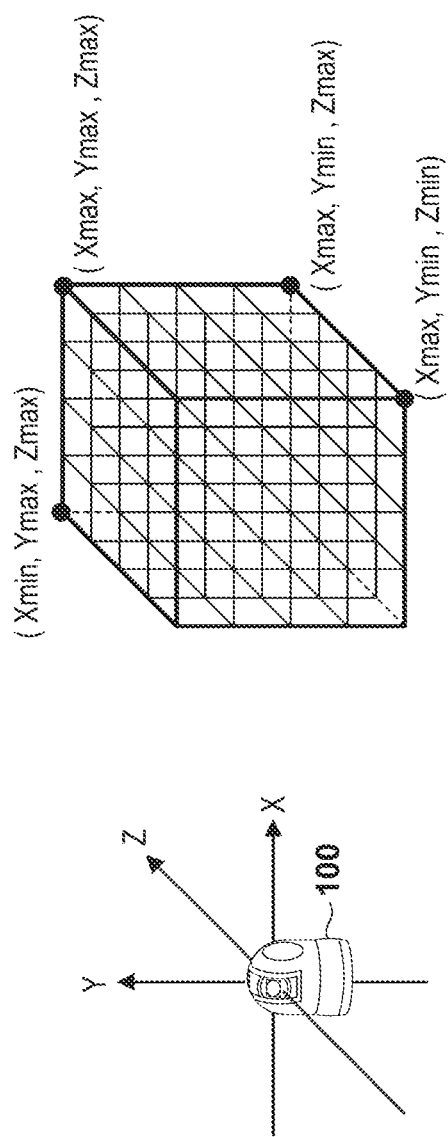
FIGS. 6A to 6C are diagrams illustrating a region specifying method for an object position according to the first embodiment.

FIG. 6A illustrates a three-dimensional space that is formed by three axes including XYZ axes orthogonal to each other with the optical unit 107 of the camera 100 serving as an origin. FIG. 6B illustrates a state when the three-dimensional space in FIG. 6A is divided into four along each of the XYZ axes. The control unit 101 converts the position information of the object acquired in step S501, into the coordinate system of the camera 100 shown in FIG. 6B, and specifies a segmented region in the XYZ coordinate system corresponding to the resultant position information subjected to the conversion. Note that, a number of division of the region is not limited to 64, and it suffices for a region in the coordinate system of the camera 100 to be specified for the position information of the object.

In step S503, the control unit 101 adds counter values of the respective regions held in the working memory 104, for the region in the coordinate system of the camera 100 corresponding to the position information of the object specified in step S502, and the procedure advances to step S504. Each of the counter values of the respective regions refers to a value indicating a frequency at which the region was specified as an object position, and a region for which the counter value indicates the largest value is a region of an object that the largest number of users are focused on.

In step S504, the control unit 101 determines whether or not position information of an object has been received from all of the eyeglass-type devices 200 with which communication is possible, and, when the control unit 101 determines that position information of an object has been received from all of the eyeglass-type devices 200, the procedure advances step S505. Otherwise, the procedure returns to step S501. Determination as to whether or not all of the position information of an object has been received may be performed using a method for determining whether or not information has been received from eyeglass-type devices 200 associated with the camera 100 in advance, or a method for determining whether or not a predetermined time has elapsed from when information was started to be received, for example.

In step S505, the control unit 101 reads out the counter values of the respective regions from the working memory 104, selects a region for which the counter value is the largest, as a region of an object on which the greatest number of users are focused, and advances the procedure to step S506.

FIG. 6C illustrates a state when a region 601 for which the counter value is largest in the region in the coordinate system of the camera 100 shown in FIG. 6B is present at the Xmax coordinate. Note that, when there are a plurality of regions for which the counter value is greatest, the control unit 101 may select a region of the most favorable object with priority given to a result of detection performed by the object detection unit 112. Note that, a region that a user is focused on may be selected using a method for holding counter values of the respective regions, for a plurality of frames, and selecting a region for which the total counter values for the plurality of frames is greatest, for example. In addition, a region for which a result of object detection, composition rating, or the like, that is performed by an external apparatus is favorable, may be selected.

In step S506, the control unit 101 performs framing in accordance with an image capturing range that includes the region selected in step S505, and ends the processing. The control unit 101 then starts processing for capturing a still image or a moving image.

According to the first embodiment, the camera 100 acquires position information of objects to which individual users are gazing, from the eyeglass-type devices 200 that the users are wearing, and selects a region of an object that is drawing the most attention from among the objects whose position information has been acquired. Accordingly, the camera 100 can automatically perform framing in accordance with an object that is drawing the most attention.

Second Embodiment

In the first embodiment, processing has been described in which the camera 100 performs framing in accordance with an object on which a plurality of users wearing the eyeglass-type devices 200 are focused. In contrast, in a second embodiment, processing will be described in which the camera 100 captures an image of a plurality of users wearing the eyeglass-type devices 200, as objects.

In the second embodiment, the configurations and functions of the camera 100 and the eyeglass-type device 200 are similar to the configurations and functions in the first embodiment shown in FIG. 1.

Control Processing of Camera 100

Control processing of the camera 100 and the eyeglass-type device 200 according to the second embodiment will be described below with reference to FIGS. 7 to 9.

FIG. 7 is a flowchart illustrating control processing of the camera 100 and the eyeglass-type device 200 according to the second embodiment. FIG. 8 is a flowchart illustrating processing of step S703 in FIG. 7. FIG. 9 is a flowchart illustrating processing of step S705 in FIG. 7.

The processing in FIG. 7 is started in a state when initialization processing of the camera 100 and the eyeglass-type device 200 (initial settings of the components after the power supply is turned on, and pairing of the camera 100 and the eyeglass-type device 200) is complete, and the camera 100 is ready to control framing.

In step S701, the control unit 201 of the eyeglass-type device 200 transmits, to the camera 100, a request to acquire position information of the camera 100, and the procedure advances to step S704.

In step S702, the control unit 101 of the camera 100 waits until a request to acquire position information of the camera 100 is received from the eyeglass-type device 200, and, when the control unit 101 determines that position information of the camera 100 has been received, the procedure advances to step S703.

In step S703, the control unit 101 of the camera 100 transmits the position information of the camera 100 to the eyeglass-type device 200, and advances the procedure to step S706. This processing will be described later with reference to FIG. 8.

In step S704, the control unit 201 of the eyeglass-type device 200 waits until position information of the camera 100 is received from the camera 100, and, when the control unit 201 determines that position information of the camera 100 has been received, the procedure advances to step S705.

In step S705, the control unit 201 of the eyeglass-type device 200 transmits position information of an object to the camera 100, and ends the processing. This processing will be described later with reference to FIG. 9.

In step S706, the control unit 101 of the camera 100 waits until position information of an object is received from the eyeglass-type device 200, and, when the control unit 101 determines that position information of an object has been received, the procedure advances to step S707.

In step S707, similarly to FIG. 5, the control unit 101 of the camera 100 performs framing based on the position information of the object received from the eyeglass-type device 200, and ends the processing. The control unit 101 of the camera 100 then starts processing for capturing a still image or a moving image.

Figure 8:
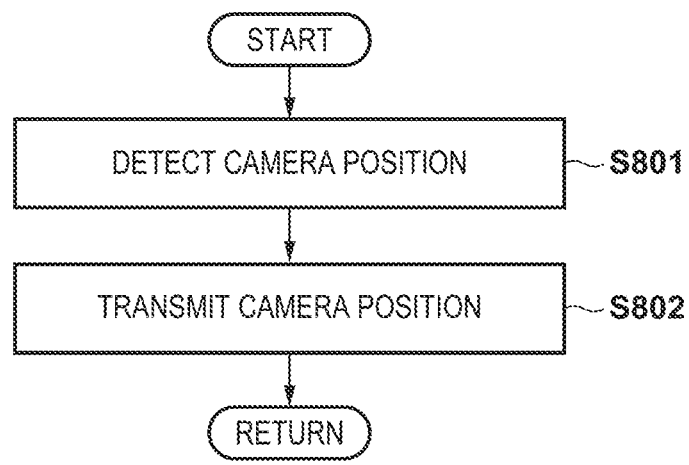
FIG. 8 is a flowchart illustrating transmission processing that is performed by the image capture apparatus according to the second embodiment.

FIG. 8 is a flowchart illustrating processing of step S703 in FIG. 7.

In step S801, the control unit 101 of the camera 100 acquires orientation information of the camera 100 detected by the orientation detection unit 111, and advances the procedure to step S802.

In step S802, the control unit 101 of the camera 100 transmits the orientation information of the camera 100 acquired in step S801 to the eyeglass-type device 200 using the communication unit 103, and the procedure advances to step S706 in FIG. 7.

FIG. 9 is a flowchart illustrating the processing of step S705 in FIG. 7.

In step S901, the control unit 201 of the eyeglass-type device 200 acquires orientation information of the eyeglass-type device 200 detected by the orientation detection unit 211, and the procedure advances to step S902.

In step S902, the control unit 201 of the eyeglass-type device 200 acquires gazing position information detected by the sight line detection unit 212, and advances the procedure to step S903.

In step S903, the control unit 201 of the eyeglass-type device 200 acquires distance information including the distance between the eyeglass-type device 200 and the gazing position detected in step S902, the distance having been detected by the distance detection unit 213, and the procedure advances to step S904.

In step S904, the control unit 201 of the eyeglass-type device 200 calculates position information of an object to which the user is gazing, by adding the distance information, including the distance to the gazing position acquired in S903, to the orientation information of the eyeglass-type device 200 acquired in step S901, and the procedure advances to step S905.

In step S905, the control unit 201 of the eyeglass-type device 200 converts the position information of the camera 100 received from the camera 100 in step S704 in FIG. 7, into the coordinate system of the eyeglass-type device 200, and compares the resultant position information with the position information of the object calculated in step S904. In addition, when the control unit 201 determines that object position and the camera position are the same or in a close positional relation within a predetermined threshold range, the control unit 201 of the eyeglass-type device 200 advance the procedure to step S906, and, otherwise, returns the procedure to step S901. Note that, when a state when the object position and the camera position are the same or in a close positional relation within a predetermined threshold continues for a predetermined time, the control unit 201 of the eyeglass-type device 200 may advance the procedure to step S906.

In step S906, the control unit 201 of the eyeglass-type device 200 transmits the object position information to the camera 100 using the communication unit 203, and ends the processing. Note that, if the user is wearing the eyeglass-type device 200, the control unit 201 of the eyeglass-type device 200 determines that the position of the user that is an object and the position of the eyeglass-type device 200 are the same, and transmits the orientation information (position information) of the eyeglass-type device 200 detected in step S901, as object position information to the camera 100. In step S707, the camera 100 performs framing based on the position information received from the eyeglass-type device 200 in step S706 in FIG. 7.

Note that, a method for calculating an object position in step S904 is not limited to the above method, and, for example, the processing of step S902 can be omitted by using distance information including the distance to the gazing position detected while the position of the display unit 208 is fixed at the center between the right-eye display unit 221R and the left-eye display unit 221L, or the like. In addition, when the distance detection unit 213 does not detect distance information (resolution) for each of the right-eye display unit 221R and the left-eye display unit 221L of the display unit 208, the processing in step S902 can be omitted by using distance information including the distance to the gazing position detected in a similar manner.

According to the second embodiment, when capturing an image of a plurality of users, the camera 100 receives the positions of the eyeglass-type devices 200 mounted to the users, which are objects, as object positions from the eyeglass-type devices 200. Accordingly, the camera 100 can automatically perform framing in accordance with the positions of the users that are objects.

Note that, in the above embodiment, an example has been described in which framing is performed by controlling the optical unit 107 in at least one of the pan direction, the tilt direction, the zoom direction, and the roll direction, but there is no limitation thereto, and, for example, framing may be realized by performing processing for extracting an image in accordance with an image capturing range (field of view) set based on an object position.

Note that, the above-described operations that have been described as being performed by the control unit 101 of the camera 100 and the control unit 201 of the eyeglass-type device 200 may be performed by a single piece of hardware, or an entire apparatus may be controlled by a plurality of pieces of hardware (for example, a plurality of processors or circuits) sharing processing.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image capture apparatus comprising:
   a communication unit configured to communicate with a plurality of wearable devices;
   an image capturing unit configured to capture an image;
   an acquisition unit configured to acquire, from the wearable devices via the communication unit, position information of an object at which users wearing the wearable devices are gazing; and
   a control unit configured to control framing based on the position information of the object acquired by the acquisition unit in response to transmission of position information of the image capture apparatus to the wearable devices via the communication unit.

2. The apparatus according to claim 1, further comprising a detection unit configured to detect an object included in an image captured by the image capturing unit and to produce a detection result,
   wherein the control unit controls framing based on the position information of the object acquired by the acquisition unit and the detection result produced by the detection unit.

3. The apparatus according to claim 2, wherein the control unit controls framing based on a type of information of the object detected by the detection unit.

4. The apparatus according to claim 2, wherein the control unit:
   specifies a region in a coordinate system of the image capture apparatus, for the position information of the object acquired by the acquisition unit,
   selects a region in which a number of specified regions is greatest, as a region on which a plurality of users are focused, and
   performs framing such that the selected region is included in an image capturing range.

5. The apparatus according to claim 4, wherein the control unit divides a three-dimensional space, in which the image capture apparatus is present, into a plurality of regions, and specifies a segmented region of the three-dimensional space corresponding to the position information of the object.

6. A wearable device comprising:
   a communication unit configured to communicate with an image capture apparatus;
   a display unit configured to display an image;
   an acquisition unit configured to acquire position information of an object at which a user wearing the wearable device is gazing;
   an acquisition unit configured to acquire position information of the image capture apparatus; and
   a control unit configured to transmit the position information of the object to the image capture apparatus via the communication unit, wherein the control unit compares the position information of the object with the position information of the image capture apparatus, and, when a position of the object and a position of the image capture apparatus are the same, or close, the control unit transmits position information of the wearable device as the position information of the object to the image capture apparatus.

7. The device according to claim 6, further comprising:
   an orientation detection unit configured to detect orientation information that includes a position of the wearable device;
   a sight line detection unit configured to detect sight line position information of a user wearing the wearable device, at the display unit, based on a sight line of the user; and
   a distance detection unit configured to detect distance information regarding a distance between the wearable device and an object displayed on the display unit, which corresponds to the sight line position of the user,
   wherein the control unit calculates position information of an object at which the user is gazing, based on the orientation information of the wearable device and the distance information regarding the distance to the object.

8. The device according to claim 6, further comprising:

an orientation detection unit configured to detect orientation information that includes a position of the wearable device;

a sight line detection unit configured to detect gazing position information of a user wearing the wearable device based on a sight line direction of the user; and a distance detection unit configured to detect distance information regarding a distance between the wearable device and the gazing position of the user, wherein the control unit calculates position information of an object at which the user is gazing, based on the orientation information of the wearable device and the distance information regarding the distance to the gazing position.

9. The device according to claim 6, wherein, when a state when the position of the object and the position of the image capture apparatus are the same, or close, continues for a predetermined time, the control unit transmits position information of the wearable device as the position information of the object to the image capture apparatus.

10. The device according to claim 6, wherein the wearable device is an eyeglass-type device.

11. An image capture apparatus comprising:

a communication unit configured to communicate with a plurality of wearable devices;

an image capturing unit configured to capture an image;

an acquisition unit configured to acquire, from the wearable devices via the communication unit, position information of an object at which users wearing the wearable devices are gazing;

a detection unit configured to detect an object included in an image captured by the image capturing unit and to produce a detection result; and a control unit configured to control framing based on the position information of the object acquired by the acquisition unit and the detection result produced by the detection unit, wherein the control unit:

specifies a region in a coordinate system of the image capture apparatus, for the position information of the object acquired by the acquisition unit, selects a region in which a number of specified regions is greatest, as a region on which a plurality of users are focused, and performs framing such that the selected region is included in an image capturing range, wherein, when there are a plurality of regions in which the number of specified regions is greatest, the control unit selects a region on which the plurality of users are focused, with priority given to the detection result produced by the detection unit.

12. A method of controlling an image capture apparatus, the control method comprising:

communicating with a plurality of wearable devices by a communication unit;

capturing an image with an image capturing unit;

acquiring, from the wearable devices via the communication unit, position information of an object at which users wearing the wearable devices are gazing; and controlling, with a control unit, framing based on the acquired position information of the object, in response to transmission of position information of the image capture apparatus to the wearable devices via the communication unit.

13. A non-transitory computer-readable storage medium storing a program for causing a computer to function as an image capture apparatus comprising:

communicating with a plurality of wearable devices by a communication unit;

capturing an image with an image capturing unit;

acquiring, from the wearable devices via the communication unit, position information of an object at which users wearing the wearable devices are gazing; and controlling, with a control unit, framing based on the acquired position information of the object, in response to transmission of position information of the image capture apparatus to the wearable devices via the communication unit.

* * * * *